United States Patent [19]

Nagao et al.

[11] Patent Number: 4,511,635
[45] Date of Patent: Apr. 16, 1985

[54] MAGNETIC RECORDING MEDIUM

[75] Inventors: Makoto Nagao; Akira Nahara, both of Kanagawa, Japan

[73] Assignee: Fuji Photo Film Co., Ltd., Kanagawa, Japan

[21] Appl. No.: 537,620

[22] Filed: Sep. 30, 1983

[30] Foreign Application Priority Data

Sep. 30, 1982 [JP] Japan ................................. 57-171675

[51] Int. Cl.³ ........................... G11B 5/65; G11B 5/66
[52] U.S. Cl. ..................................... 428/694; 360/134; 360/135; 360/136; 427/131; 427/132; 428/900; 428/928; 428/678; 428/655; 428/621
[58] Field of Search ................. 427/131, 132; 428/694, 428/900, 678, 928, 655, 621, 212; 360/134–136

[56] References Cited

U.S. PATENT DOCUMENTS

| 4,239,835 | 12/1980 | Iijima et al. | 427/132 |
| 4,323,621 | 4/1982 | Kober et al. | 427/131 |
| 4,323,629 | 4/1982 | Kunieda et al. | 427/132 |
| 4,387,136 | 6/1983 | Saito et al. | 427/131 |
| 4,418,126 | 11/1983 | Izumi | 427/132 |
| 4,429,016 | 1/1984 | Sugita | 427/131 |

Primary Examiner—Ellis P. Robinson
Attorney, Agent, or Firm—Sughrue, Mion, Zinn, Macpeak, and Seas

[57] ABSTRACT

A magnetic recording medium comprises a non-magnetic high-molecular film and at least one magnetic layer containing Co, Ni, Cr and oxygen and formed on the non-magnetic high-molecular film by an oblique incidence vacuum deposition method. The Cr content is within the range of 2 to 8 atom %, the content of oxygen is within the range of 5 to 25 atom %, and the ratio of the number of oxygen atoms to the number of Cr atoms is within the range of 2:1 to 10:1.

11 Claims, 1 Drawing Figure

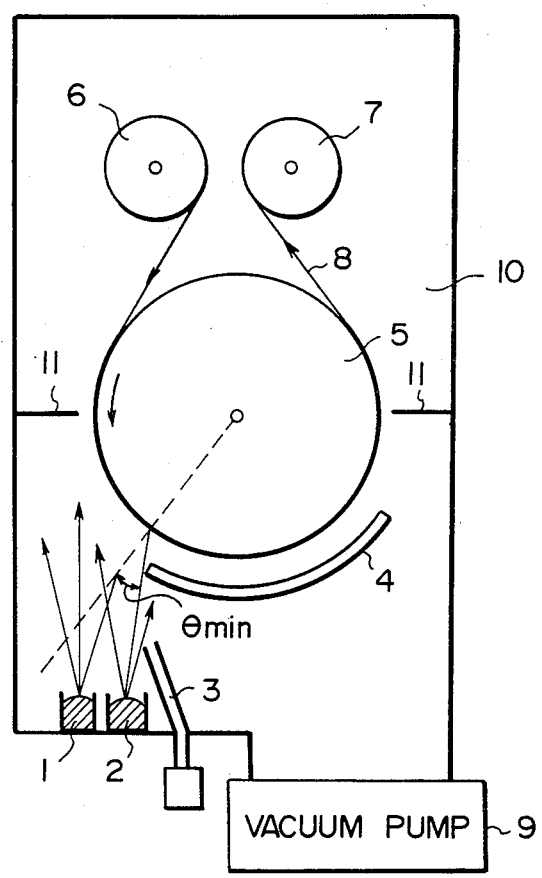

MAGNETIC RECORDING MEDIUM

BACKGROUND OF THE INVENTION

1. Field of the Invention

This invention relates to an improvement of a magnetic recording medium provided with at least one layer of obliquely deposited magnetic crystals wherein ferromagnetic columnar grains are formed on a substrate at an oblique angle with respect to the substrate by causing a stream of vapor obtained by heating and evaporating a ferromagnetic material to obliquely impinge upon the substrate in a vacuum.

2. Description of the Prior Art

There is nowadays a need for a magnetic recording medium able to meet the strong demand for high density recording. Particularly, various efforts are being made to develop a thin metal film type magnetic recording medium suitable as a high density magnetic recording medium. Thin metal film is formed by various methods such as vacuum deposition, ion plating, sputtering and wet plating. However, as a method capable of consistently producing a high coercive force medium suitable for high density recording, the oblique incidence vacuum deposition method as disclosed in Japanese Patent Publication No. 41(1966)-19389 is especially good.

In the oblique incidence vacuum deposition method, a stream of vapor obtained by heating and evaporating a ferromagnetic material such as Co, or Co—Ni is caused to impinge upon a non-magnetic substrate made of a high-molecular material or the like in a vacuum generally at an angle of 45° or more with respect to the line normal to the substrate, thereby forming ferromagnetic columnar grains on the substrate at an oblique angle with respect to the substrate. In order to obtain a high coercive force of about 1,000 Oe by use of a Co material or a Co—Ni material as the deposition material, it is generally necessary that the minimum angle of incidence ($\theta$min) be about 60° or more.

However, when oblique incidence vacuum deposition is conducted at a minimum angle of incidence ($\theta$min) of 60° or more, the portion of the vapor stream interrupted by a mask is increased, and the amount of the vapor stream deposited on the substrate is decreased markedly, resulting in a marked decrease in the deposition efficiency and deposition speed.

To eliminate the drawbacks of the aforesaid oblique incidence vacuum deposition method, it has been proposed to conduct oblique incidence vacuum deposition in an oxygen atmosphere. In the method of conducting oblique incidence vacuum deposition in an oxygen atmosphere, it is possible to obtain a deposited magnetic layer exhibiting a high coercive force and, consequently, decrease the minimum angle of incidence ($\theta$min) in the deposition process. Namely, this method is suitable for increasing the coercive force of the obtained magnetic layer and decreasing the angle of incidence of the vapor stream of the deposition material. However, the obliquely deposited Co or Co—Ni film formed by the oblique incidence vacuum deposition method or the method of oblique incidence vacuum deposition in an oxygen atmosphere exhibits insufficient resistance to rusting, which constitutes an obstacle to putting the method to practical use.

In order to improve the resistance of the magnetic layer to rusting, it has been proposed to add Cr to the deposition material. However, to obtain a desired level of rust resistance, it is necessary to add Cr in a large amount, for example, in an amount of 10 atom % or more. As a result, the magnetic flux density and the electromagnetic transducing characteristics of the obtained magnetic layer become very low.

SUMMARY OF THE INVENTION

The primary object of the present invention is to provide a magnetic recording medium exhibiting a high resistance to rusting.

Another object of the present invention is to provide a magnetic recording medium exhibiting excellent magnetic characteristics.

The inventors conducted experiments on the effects of adding Cr to the deposition material in order to develop a magnetic recording medium exhibiting a high resistance to rusting and excellent magnetic characteristics, and found that a magnetic recording medium exhibiting a high resistance to rusting and excellent magnetic characteristics can be obtained by adding Cr and oxygen in an amount within a specific range to the deposition material.

The present invention provides a magnetic recording medium comprising a non-magnetic high-molecular film and at least one magnetic layer containing Co, Ni, Cr and oxygen and formed on said non-magnetic high-molecular film by an oblique incidence vacuum deposition method, wherein the content of said Cr is within the range of 2 to 8 atom %, the content of said oxygen is within the range of 5 to 25 atom %, and the ratio of the number of oxygen atoms to the number of Cr atoms is within the range of 2:1 to 10:1.

In the present invention, the magnetic layer may further contain a very small amount of other elements, for example, Mg, Mo, Ta, and W.

The magnetic recording medium in accordance with the present invention may comprise a single magnetic layer or two or more magnetic layers. Further, the magnetic layer or layers may be combined with an intermediate layer and/or a base layer.

Further, the magnetic layer side or the non-magnetic high-molecular film side of the magnetic recording medium may be treated to improve various characteristics for practical purposes.

Namely, in one aspect of the present invention, there is provided a magnetic recording medium comprising a non-magnetic high-molecular film and at least one magnetic layer having the Co—Ni—Cr—O composition as defined above and formed on the non-magnetic high-molecular film, wherein said magnetic layer further contains Mg in an amount within the range of 0.05 to 3 atom %. This magnetic recording medium exhibits excellent time stability and a high signal-to-noise ratio.

In another aspect of the present invention, there is provided a magnetic recording medium comprising a non-magnetic high-molecular film and at least one magnetic layer having the Co—Ni—Cr—O composition as defined above and formed on the non-magnetic high-molecular film, wherein said magnetic layer further contains at least one element selected from the group consisting of Mo, Ta and W in an amount within the range of 0.1 to 3 atom %. This magnetic recording medium exhibits excellent time stability and a high resistance to wear.

In another aspect of the present invention, there is provided a magnetic recording medium a non-magnetic high-molecular film and at least one magnetic layer having the Co—Ni—Cr—O composition as defined above and formed on the non-magnetic high-molecular film, wherein Cr and oxygen are distributed in the thickness direction of the magnetic layer in such a manner that the mean ratio of the number of oxygen atoms to the number of Cr atoms increases towards the non-magnetic high-molecular film. This magnetic recording medium also exhibits a high resistance to rusting and excellent magnetic characteristics.

In a further aspect of the present invention, there is provided a magnetic recording medium comprising a non-magnetic high-molecular film and at least two magnetic layers formed on the non-magnetic high-molecular film, wherein the first magnetic layer essentially consists of Co, Ni and O, and the second magnetic layer has the Co—Ni—Cr—O composition as defined above, said first magnetic layer being positioned closer to the non-magnetic high-molecular film than said second magnetic layer. This magnetic recording medium exhibits a high resistance to rusting and high durability. The first magnetic layer should preferably contain Co in an amount within the range of 90 to 45 atom %, Ni in an amount within the range of 5 to 25 atom %, and oxygen in an amount within the range of 5 to 30 atom %.

In the magnetic recording medium just described, the first magnetic layer essentially consisting of Co, Ni and O may further contain Mg in an amount within the range of 0.05 to 3 atom %. In this case, the time stability and signal-to-noise ratio of the magnetic recording medium are further improved.

Further, the first magnetic layer essentially consisting of Co, Ni and O may also contain at least one element selected from the group consisting of Mo, Ta and W in an amount within the range of 0.1 to 3 atom %. In this case, the time stability and resistance to wear of the magnetic recording medium are further improved.

The present invention also provides a magnetic recording medium comprising a non-magnetic high-molecular film and at least two magnetic layers formed on the non-magnetic high-molecular film, wherein at least one magnetic layer has the Co—Ni—Cr—O composition as defined above, and the Cr content in the uppermost magnetic layer is higher than the Cr content in the lowermost magnetic layer contacting the non-magnetic high-molecular film.

The present invention also provides a magnetic recording medium comprising a non-magnetic high-molecular film and at least two magnetic layers formed on the non-magnetic high-molecular film, wherein at least one magnetic layer has the Co—Ni—Cr—O composition as defined above, and the coercive force of the uppermost magnetic layer is higher than the coercive force of the lowermost magnetic layer contacting the non-magnetic high-molecular film.

The present invention will hereinbelow be described in further detail with reference to the accompanying drawing.

BRIEF DESCRIPTION OF THE DRAWING

The single drawing is a schematic sectional view showing an embodiment of the apparatus for making the magnetic recording medium in accordance with the present invention.

DETAILED DESCRIPTION OF THE INVENTION

The accompanying drawing shows a vacuum deposition apparatus suitable for making the magnetic recording medium in accordance with the present invention. The vacuum deposition apparatus comprises a vacuum chamber 10 evacuated with a vacuum pump 9. In the vacuum chamber 10 are positioned a cooling can 5 for supporting and guiding a tape-like non-magnetic high-molecular film 8 fed from a tape feed roll 6 to a tape wind-up roll 7, deposition materials 1 and 2 heated and evaporated to form a magnetic layer on the non-magnetic high-molecular film 8, and a mask 4 positioned between the cooling can 5 and the deposition materials 1 and 2. The mask 4 defines the minimum angle of incidence ($\theta$min) among the angles ($\theta$) of the vapor streams evaporated from the deposition materials 1 and 2 with respect to the line normal to the surface of the non-magnetic high-molecular film 8. Further, an oxygen inlet 3 for feeding oxygen into the vacuum chamber 10 is communicated with the vacuum chamber 10. A partition plate 11 for isolating the film conveying system from the deposition system is positioned in the vicinity of the central portion of the vacuum chamber 10.

In the apparatus constructed as described above, the vacuum chamber 10 is evacuated by the vacuum pump 9. The deposition materials 1 and 2, Cr and Co—Ni, for example, are heated by a known heating means, for example, by electron beam heating. When heated, the deposition materials 1 and 2 become molten and evaporate to form vapor streams, which flow upwardly in the vacuum chamber 10 and deposit on the non-magnetic high-molecular film 8. During deposition, oxygen is introduced from the oxygen inlet 3 into the vacuum chamber 10 so that deposition is conducted in an adequate oxygen atmosphere and oxygen atoms are contained in a desired amount in the magnetic layer formed on the non-magnetic high-molecular film 8. When the cooling can 5 is rotated and a portion of the non-magnetic high-molecular film 8 fed from the tape feed roll 6 is guided along the cooling can 5, the angle of incidence ($\theta$) of the vapor stream with respect to the line normal to said portion of the non-magnetic high-molecular film 8 changes from a larger angle (about 90°) to a smaller angle, and deposition is conducted in this condition. When the aforesaid portion of the non-magnetic high-molecular film 8 goes beyond the point where the angle of incidence ($\theta$) is equal to the minimum angle of incidence ($\theta$min), deposition on the aforesaid portion is finished, and the aforesaid portion is wound up around the tape wind-up roll 7.

In the vacuum deposition apparatus described above, two deposition materials are positioned independently of each other and evaporated simultaneously. However, in order to obtain the magnetic recording medium of the present invention, any other method may be used insofar as at least one magnetic layer having a predetermined composition is formed on the non-magnetic high-molecular film 8. For example, it is also possible to use a Co—Ni—Cr alloy material having a predetermined composition as a single deposition material.

The present invention will now be illustrated by the following nonlimitative example.

Example

Oblique incidence vacuum deposition was conducted using a 10 $\mu$m-thick polyethylene terephthalate (PET) film as the non-magnetic high-molecular film. As the deposition materials, a material consisting of 90 atom % of Co and 10 atom % of Ni and a Cr material, or a material consisting of 80 atom % of Co and 20 atom % of Ni and a Cr material were used. Deposition was conducted at a θmin of 42° using a 16 kW electron beam as the heating means in the apparatus as shown in the accompanying drawing. The speed of conveying the non-magnetic high-molecular film was 10 m/min., and the degree of vacuum in the vacuum chamber was about $10^{-5}$ torr. By changing the Cr heating power and the oxygen feed rate, magnetic layers containing different amounts of Cr and oxygen were prepared. Compositions of the prepared magnetic layers were measured by Auger analysis. The thicknesses of the magnetic layers were measured using a feeler type film thickness gauge. The thicknesses of the magnetic layers prepared as described above were about 1,500 Å. To measure the resistance to rusting, the samples were left to stand for 200 days in a constant-temperature, constant-humidity atmosphere at a temperature of 60° C. and a relative humidity of 90%, and existence of rust (local corrosion) on the surfaces of the magnetic films was investigated by using an optical microscope.

It is known that the reproduction output depends on the magnetic flux density of the magnetic film. The experiments conducted by the inventors revealed that, in order to exhibit satisfactory recording and reproducing characteristics, the magnetic recording medium formed by the oblique incidence vacuum deposition method must exhibit a magnetic flux density of 4,000 gauss or more.

Accordingly, in this example, the magnetic flux density was calculated from the magnetic flux and the film thickness, and the calculated value was compared with 4,000 gauss. The magnetic flux was measured by using a sample vibration type magnetization measuring instrument.

Tables 1 and 2 show the results of the experiments. The results shown in Table 1 were obtained when the ratio of the number of Co atoms to the number of Ni atoms was 90:10. The results shown in Table 2 were obtained when the ratio of the number of Co atoms to the number of Ni atoms was 80:20.

TABLE 1

| Chromium content (Cr) | Oxygen content (O) | O/Cr | Rusting | Magnetic flux density |
|---|---|---|---|---|
| 0 | 5 | — | X | O |
| 1 | 3 | 3 | X | O |
|   | 10 | 10 | O | O |
| 2 | 5 | 2.5 | O | O |
|   | 16 | 8 | O | O |
|   | 20 | 10 | O | O |
|   | 30 | 15 | O | X |
| 5 | 5 | 1 | X | O |
|   | 15 | 3 | O | O |
|   | 30 | 6 | O | X |
|   | 50 | 10 | O | X |
| 8 | 8 | 1 | X | O |
|   | 16 | 2 | O | O |
|   | 25 | ~3 | O | O |
|   | 32 | 4 | O | X |
| 10 | 7 | ~1 | X | X |
|   | 20 | 2 | O | X |
|   | 42 | ~4 | O | X |

Evaluation of rusting:
O: No rust was formed.
X: Rust was formed.
Evaluation of magnetic flux density:
O: 4,000 gauss or more
X: Less than 4,000 gauss

TABLE 2

| Cr content | O content | O/Cr | Rusting | Magnetic flux density |
|---|---|---|---|---|
| 0 | 6 | — | X | X |
| 1 | 5 | 5 | X | X |
|   | 11 | 11 | X | X |
| 2 | 6 | 3 | O | O |
|   | 12 | 6 | O | O |
|   | 20 | 10 | O | O |
|   | 36 | 13 | X | X |
| 3 | 10 | 3 | O | O |
|   | 20 | 7 | O | O |
|   | 40 | 13 | O | X |
| 4 | 10 | 2.5 | O | O |
|   | 25 | 6 | O | O |
|   | 28 | 7 | O | X |
| 8 | 8 | 1 | X | O |
|   | 18 | 2 | O | O |
|   | 30 | 4 | O | X |
| 9 | 8 | 1 | O | X |
|   | 18 | 2 | O | X |
|   | 20 | 2 | O | X |

Evaluation of rusting:
O: No rust was formed.
X: Rust was formed.
Evaluation of magnetic flux density:
O: 4,000 gauss or more
X: Less than 4,000 gauss From the results shown above, it was found that the magnetic recording medium comprising a magnetic layer essentially consisting of Co, Ni, Cr and oxygen wherein the content of Cr is within the range of 2 to 8 atom %, the content of oxygen is within the range of 5 to 25 atom %, and the ratio of the number of oxygen atoms to the number of Cr atoms is within the range of 2:1 to 10:1 exhibits a high resistance to rusting and excellent magnetic characteristics. However, the reason why Cr and oxygen have such effects on the resistance to rusting and the magnetic characteristics has not been clarified.

In the experiments described above, the ratio of the number of Co atoms to the number of Ni atoms was 80:20 and 90:10. It was found that approximately the same results are obtained also when the ratio of the number of Co atoms to the number of Ni atoms is 75:25 and 95:5.

We claim:

1. A magnetic recording medium comprising a non-magnetic high-molecular film and at least one magnetic layer containing Co, Ni, Cr and oxygen and formed on said non-magnetic high-molecular film by an oblique incidence vacuum deposition method, wherein the content of said Cr is within the range of 2 to 8 atom %, the content of said oxygen is within the range of 5 to 25 atom %, and the ratio of the number of oxygen atoms to the number of Cr atoms is within the range of 2:1 to 10:1.

2. A magnetic recording medium as defined in claim 1 wherein the ratio of the number of Co atoms to the number of Ni atoms is within the range of 75:25 to 95:5.

3. A magnetic recording medium as defined in claim 1 wherein said magnetic layer further contains Mg in an amount within the range of 0.05 to 3 atom %.

4. A magnetic recording medium as defined in claim 1 wherein said magnetic layer further contains at least one element selected from the group consisting of Mo, Ta and W in an amount within the range of 0.1 to 3 atom %.

5. A magnetic recording medium as defined in claim 1 wherein Cr and oxygen are distributed in the thickness direction of said magnetic layer in such a manner that the mean ratio of the number of oxygen atoms to the number of Cr atoms increases towards said non-magnetic high-molecular film.

6. A magnetic recording medium as defined in claim 1 wherein there are provided at least two magnetic layers, the first magnetic layer essentially consists of Co, Ni and O, and the second magnetic layer is as defined in claim 1, said first magnetic layer being positioned closer to said non-magnetic high-molecular film than said second magnetic layer.

7. A magnetic recording medium as defined in claim 6 wherein said first magnetic layer contains Co in an amount within the range of 90 to 45 atom %, Ni in an amount within the range of 5 to 25 atom %, and oxygen in an amount within the range of 5 to 30 atom %.

8. A magnetic recording medium as defined in claim 6 or 7 wherein said first magnetic layer further contains Mg in an amount within the range of 0.05 to 3 atom %.

9. A magnetic recording medium as defined in claim 6 or 7 wherein said first magnetic layer further contains at least one element selected from the group consisting of Mo, Ta and W in an amount within the range of 0.1 to 3 atom %.

10. A magnetic recording medium as defined in claim 1 wherein there are provided at least two magnetic layers including at least one magnetic layer having the composition as defined in claim 1, the Cr content in the uppermost magnetic layer being higher than the Cr content in the lowermost magnetic layer contacting said non-magnetic high-molecular film.

11. A magnetic recording medium as defined in claim 1 wherein there are provided at least two magnetic layers including at least one magnetic layer having the composition as defined in claim 1, the coercive force of the uppermost magnetic layer being higher than the coercive force of the lowermost magnetic layer contacting said non-magnetic high-molecular film.

* * * * *